Feb. 8, 1949.    M. GIVENS    2,461,267

TIRE CHAIN HOLDER

Filed April 11, 1947

Melvin Givens  Inventor

By Peter J. Saylor  Attorney

Patented Feb. 8, 1949

2,461,267

UNITED STATES PATENT OFFICE 2,461,267

TIRE CHAIN HOLDER

Melvin Givens, Montclair, N. J., assignor to Peter G. Gaylor and Fred Laifer, both of Newark, N. J.

Application April 11, 1947, Serial No. 740,890

5 Claims. (Cl. 152—233)

This invention relates to automobile tire chains. More specifically, it deals with a convenient and effective means for mounting emergency-type chains over tires on motor vehicles.

The conventional type of emergency chain comprises a length of chain on the ends of which are attached canvas or duck straps have a buckle closure. To mount such chains on a car, it is practically necessary to lie on the ground and, usually, difficulty is encountered in threading the straps through the holes in the solid wheels, the operation being difficult even with the use of both arms. In addition to this, many of the cars now coming on the market are provided with wheels having no provisions for accommodating such chains.

There have been proposed means for inserting flat anchor strips between the rim and the tire wall, and attaching the chain ends to projections therefrom, but actual road tests have shown that such anchor strips are pulled out when the wheel is spun around in snow of 5–6 inches depth. Another disadvantage of such devices is that it is necessary to take off each wheel in order to insert the anchor strips. A further objection is that connecting means for holding the chains on the strips are not satisfactory and allow excessive slack which not only produces lost motion and encourages disengagement, but also provides a sudden whipping action upon the anchor strips when the wheel is spun around in snow, resulting in snapping off of the top portion of the anchor strip.

One object of this invention is to provide a tire chain anchoring device which can be mounted with the wheel on the car and which will not pull out under heavy duty conditions. Another object is to provide engagement means for the chain which is simple in operation, which pulls up the slack in the chain, and which does not necessitate stooping in line of traffic on the highway when the chains are to be mounted or demounted. Other objects will become apparent from the accompanying drawing and description which is to follow.

Figure 1:
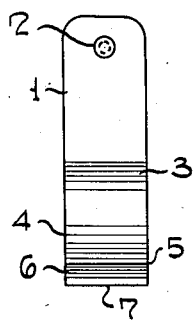
Figure 2:
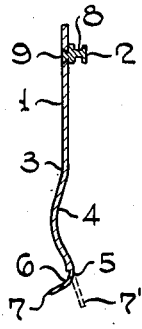
Figure 3:
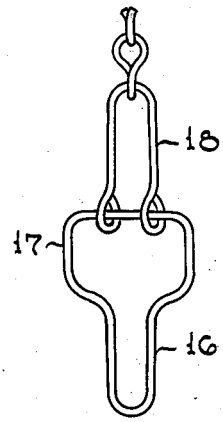
Figure 4:
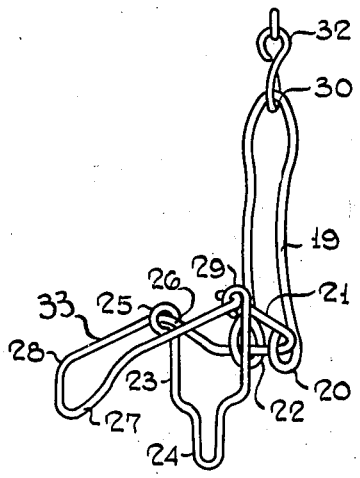
Figure 5:
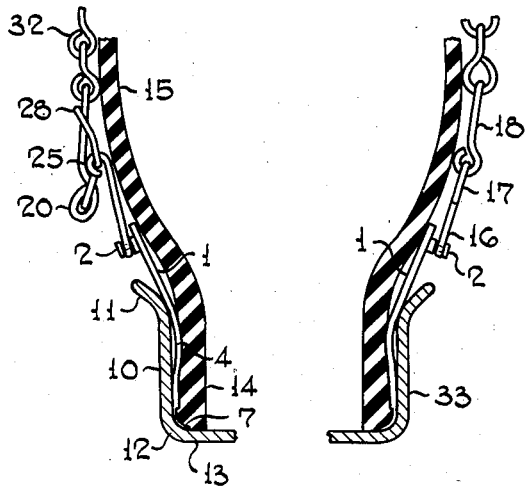

In the drawing, Figure 1 is a front view of an anchor strip of the present invention, while Figure 2 shows a cross-sectional side view thereof. Figure 3 is an enlarged front view of an inner attaching link for hooking the chain to the anchor strip, while Figure 4 is an enlarged isometric view of the fastening means employed for fastening the chain to the outer anchor strip. A cross-sectional view of a tire-rim combination, with the device of the present invention mounted thereon, is shown in Figure 5. Similar numbers refer to similar parts in the various figures.

Referring again to the drawing, numeral 1 represents a metal strip preferably about 2½" long, ¾" wide and ⅟₁₆" thick, and preferably of steel or stainless steel, having a bulged out portion 4, which bulges out about ¼" to ⅜", the bulge beginning near the center section 3, and terminating within ½" or so of the bottom. The lower ½", or ¼" to ⅝" bottom portion 7 is reduced in thickness to about one-half the thickness, or, in this case to about ₃⁄₃₂". When the strip is inserted between the tire wall and the rim, as in Figure 5, the lower portion 7 projects out at an angle of about 20–35° with respect to the upper straight portion 1 and as a continuation of bulge portion 4. In the center of the upper section of straight portion 1 is attached engaging knob 2 (about ½" diam.) having recessed side portion 8 (about ⅟₁₆" diam.) for holding a chain link such as 16. This knob may be screwed into a hole 9 or welded on to section 1 of the anchor strip. It will be observed that the knob is on the outer side of the anchor strip and on the same side as the concave portion of the bulge 4 which faces the tire wall and tends to spread out and grip the rim surface when the tire is inflated.

Link 16 carrying tire chain 18 is provided for engaging the chain to knob 2 of anchor strip 1 employed on the inner side of the tire and rim, i. e. the side facing the under-portion of the car. To engage and lock the tire chain onto the anchor on the outer side of the tire and rim, the device shown in Figure 4 is provided. Tire chain 32 is attached by means of link 30 to long U-shaped link 19, the ends 20 and 22 of which are curled around the U-portion 21 of locking member 28, which widens out on each side from the U to straight portion 26 carrying looped ends 25 and 29 of engaging link 23, and straightens out again at 33 and the two straight portions 33 are joined at upturned tip 27. The narrowed portion 24 of link 23 is slipped over collar 8 of knob 2 and locking member 33 is lifted toward chain 32. This causes U-member 21 to move downward, taking up the slack in chain 32. Locking member 33 is then pushed up against link 19, making the unit ready for use. The clearance between U-member 21 and engaging link 23 may be close so that a snapping effect is achieved during the locking operation, when the assembly appears as in Figure 5, the right side being the inner side of the wheel.

The application of the device and use may be outlined as follows: The tire is preferably deflated until it contains about 5–10 p. s. i. air pressure. Then anchor strip 1 having straight projecting bottom portion 7' is inserted in the desired location, between the tire wall 15 and rim 11, with knob 2 facing away from the tire. The top portion of strip 1 is tapped with a hammer until resistance is observed when end 7' hits corner 12 of rim 10. Then the top of strip 1 is given a few hard taps, when resistance will be observed to be weakened as end 7' is curled under the outer edge of bead 14, the end being shown in final position by numeral 7. Another anchor strip is similarly mounted opposite the first mentioned strip, but on the outer side of the wheel, as in Figure 5. Wetting the strip with water or soap and water prior to insertion between tire and rim will facilitate driving of the anchor strip into position.

When the strips have been mounted in anchoring position, the tire is inflated to operating pressure and the strips are left on the wheel at all times. It is advisable to properly space the strips so that the wheel remains in proper balance. When the chains are to be attached to the wheels, the car is moved until the anchoring strips are made accessible from the rear of the car. Then, without the necessity of stooping or extending the body out into the road, the body is held close to the side of the car and one arm is employed to grip the forward edge of the fender while the other hand holding link 16 is slipped over to the inner side of the wheel and link 16 is hooked onto knob 2. The hand is then slipped over the chain tightly and the other end of the chain is transferred to the other hand, whereupon, while still keeping close to the side of the car, link 24 is slipped over knob 2 of the outer portion of the wheel opposite the previously mentioned anchor strip, and locking member 33 is then snapped up in place, the operation also pulling up the slack in the chain simultaneously.

This application is a continuation-in-part of my copending application Serial No. 703,730 filed on October 17, 1946.

It is understood that the dimensions specified here are applicable to passenger automobiles of present make, and suitable changes may be made for trucks and other vehicles. The height of the strips can be calculated from the rim dimensions, allowing for about 1/2" space between the rim edge and the periphery of the knob to allow insertion of the engaging link.

It is understood that although the knob 2 type of engagement with the chain link is preferred, other types of engaging means, such as a hook, etc. may be employed. Also, although the locking and slack-taking assembly shown in Fig. 4 is preferred, other engaging and locking means may be used. Also, bulge 4 on anchor strip 1 may be eliminated, although the results obtained are not as desirable as when such bulge is present. In the case where the bulge is absent, it is desirable to set the thinner portion at an angle with the straight thicker portion as outlined previously.

I claim:

1. In a holder for a tire chain section employing separate oppositely disposed anchoring strips inserted on the wheel between the tire wall and the rim, for holding the ends of the chain section, the invention comprising narrow, rigid strips of sufficient thickness in their upper section to withstand hitting on the top with a hammer, and of length sufficient to extend from above the wheel rim edge to below the tire bead, and a lower section on said strip of less thickness and of such weaker strength as to cause bending thereof at the inner angular portion of the rim near the tire bead when the top of the strip is hit with a hammer, thereby allowing the angular portion to guide the bent strip section under the tire bead, thus anchoring the strip.

2. A holder for a tire chain section according to claim 1 in which the upper sections of the anchor strips are relatively straight and provided with a recessed knob protruding from the outer surface of the strip, said knob serving to engage a link on the end of the chain section.

3. A holder for a tire chain section according to claim 2 in which the anchor strips are provided with a bulge in the middle section thereof, the radius of curvature of the bulge being less than that of the rim section to be in juxtaposition therewith, and the convex side of the bulge facing the tire wall.

4. A holder for a tire chain section according to claim 3 in which the lower section is bent away from the tire wall to be in contact therewith and the inner anchor strip is engaged with a link having a narrow lower portion fitting into the recess of the knob.

5. In a holder for a tire chain section employing separate oppositely disposed anchoring strips mounted between the tire wall and the rim, for holding the ends of the chain section, the invention comprising narrow, rigid strips of sufficient thickness in their upper section to withstand hitting on the top with a hammer and of length sufficient to extend from above the wheel rim to below the tire bead, and a lower section on said strips of less thickness and of weaker strength, curled around the outside of the tire beads for a sufficient distance to act as anchors for said strips.

MELVIN GIVENS.

REFERENCES CITED

The following references are of record in the file of this patent:

UNITED STATES PATENTS

| Number | Name | Date |
| --- | --- | --- |
| 398,714 | Farr | Feb. 26, 1889 |
| 1,053,893 | Walter | Feb. 18, 1913 |
| 1,159,320 | Lashar | Nov. 2, 1915 |
| 1,194,433 | Silberman | Aug. 15, 1916 |